Jan. 30, 1951     C. B. SMITH     2,539,489
CONVERTIBLE AUTOMOBILE AIRPLANE
Filed Oct. 28, 1947     3 Sheets-Sheet 1
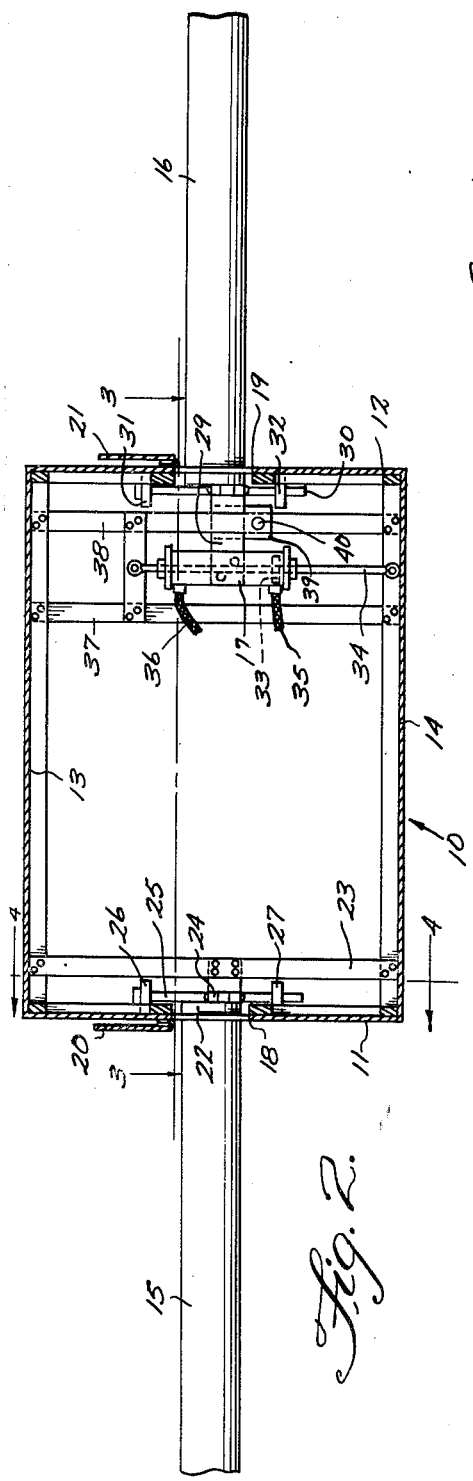
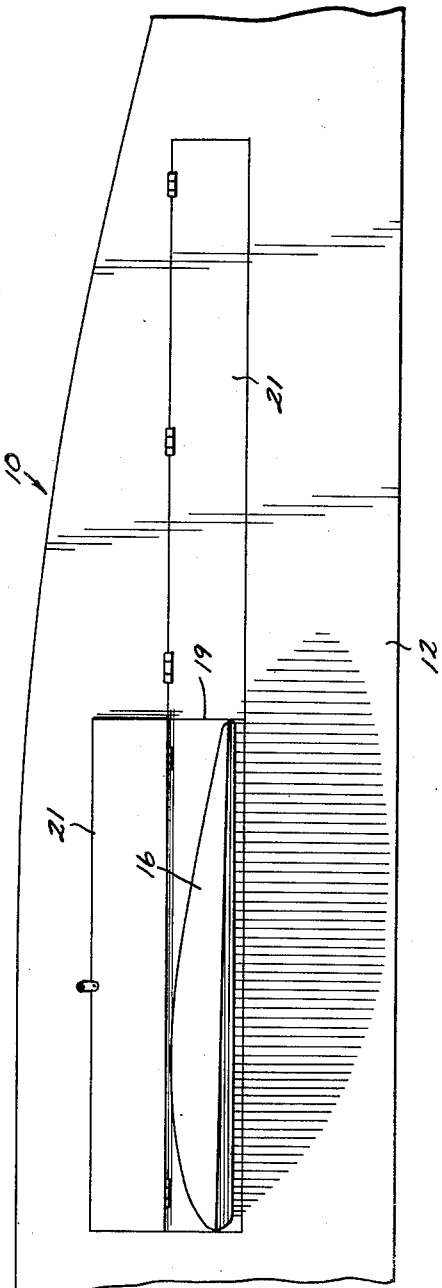
INVENTOR.
Charles B. Smith,
BY Victor J. Evans & Co.
ATTORNEYS

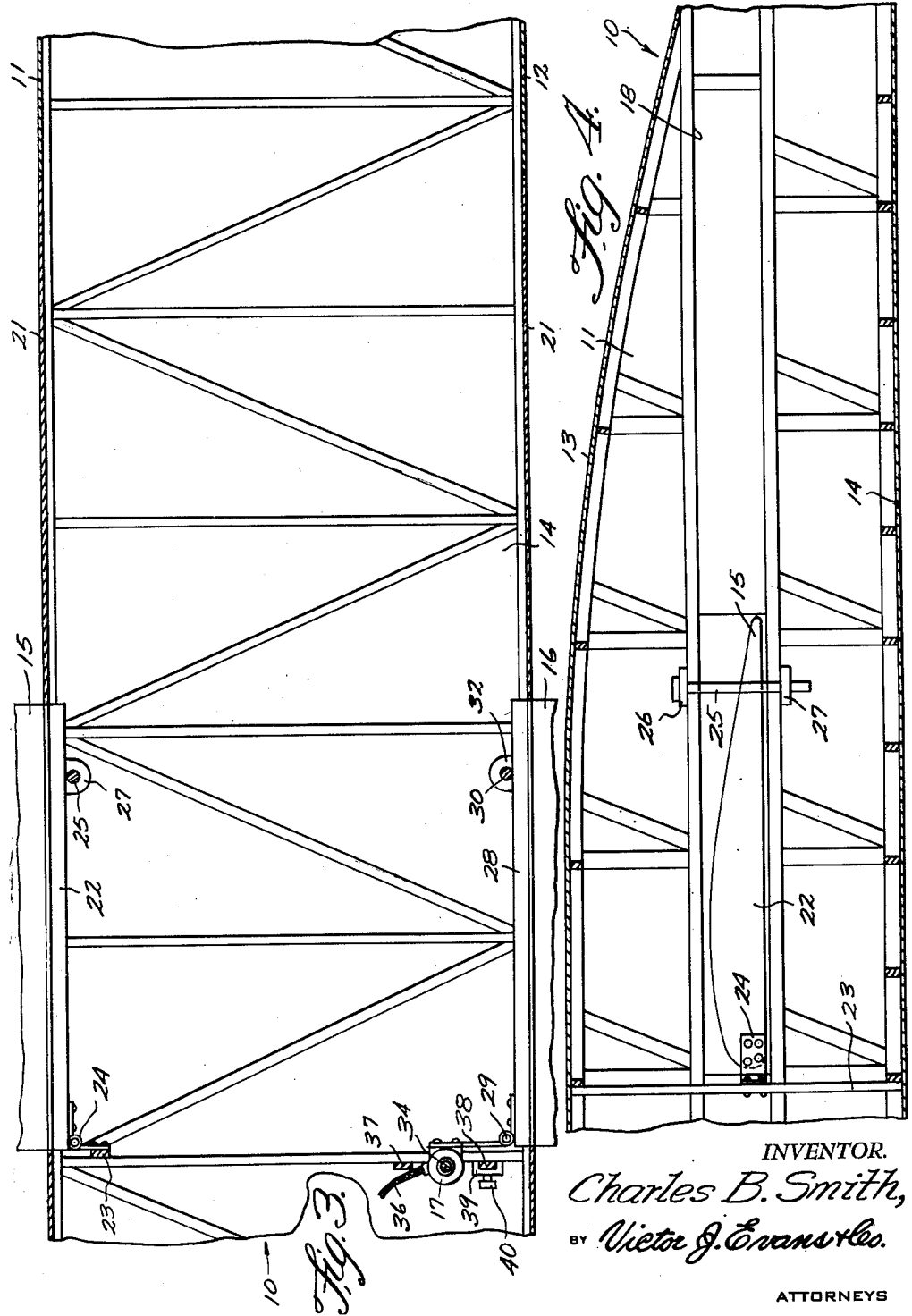

Jan. 30, 1951
C. B. SMITH
2,539,489
CONVERTIBLE AUTOMOBILE AIRPLANE
Filed Oct. 28, 1947
3 Sheets-Sheet 3
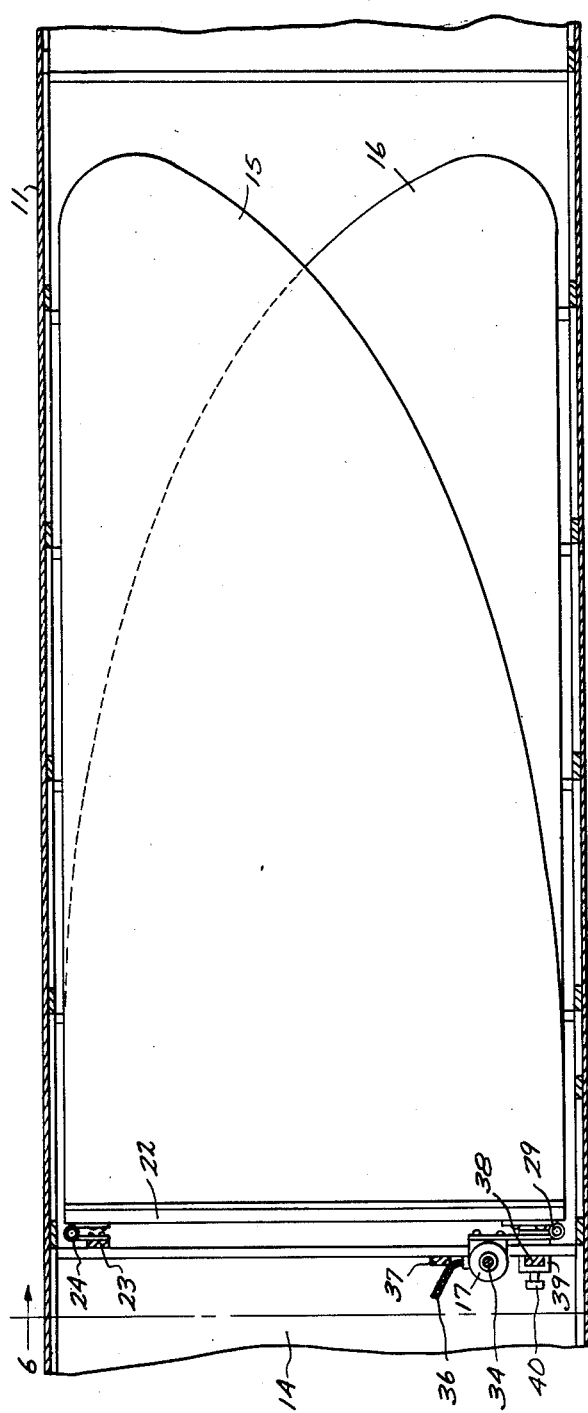
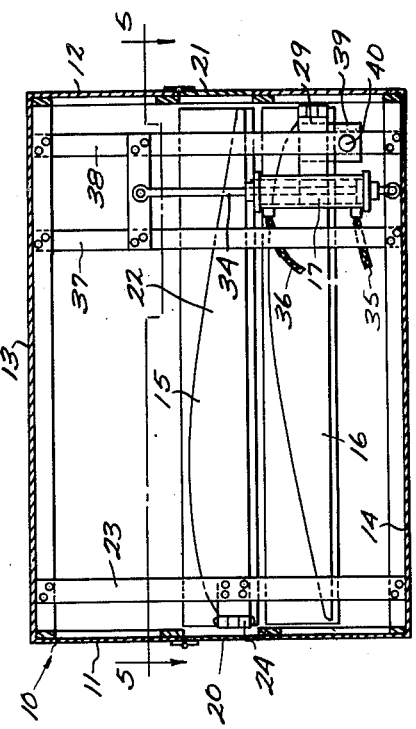
INVENTOR.
Charles B. Smith,
BY Victor J. Evans & Co.
ATTORNEYS Patented Jan. 30, 1951

2,539,489

UNITED STATES PATENT OFFICE 2,539,489

CONVERTIBLE AUTOMOBILE AIRPLANE

Charles B. Smith, Oak Grove, Va.

Application October 28, 1947, Serial No. 782,553

4 Claims. (Cl. 244—2)

This invention relates to a combination motor vehicle body adapted for use on the ground or in the air, and in particular includes a streamlined airflow body or fuselage having hinged wings that fold into the body and means for lowering one of the wings wherein one wing will nest over the other.

The purpose of this invention is to provide means for folding the wings of an airship so that the wings will disappear into the fuselage with one wing above the other when it is desired to use the device for land travel.

Various methods have been devised for folding and collapsing the wings of airships but because of the hazard of too many joints and the size of the wings it is difficult to fold the wings so that they are completely out of the way wherein the device may also be used as an automobile. With this thought in mind this invention contemplates a fuselage or body having wings wherein the wings are pivotally mounted at the intersection of the leading edges thereof with the fuselage and the fuselage is formed with openings through the sides to receive the wings and means for dropping one wing below the other.

The object of this invention is to provide means for constructing a body having wings wherein the body has sufficient internal area to accommodate the wings and in which the wings may be folded into the body without collapsing the wing sections.

Another object of the invention is to provide means for pivotally mounting wings in a fuselage wherein one wing may be swung into an opening in the fuselage and lowered, and the other wing may be swung into the same opening so that one wing is positioned over the other in the folded position.

A further object of the invention is to provide a fuselage having folding wings that may also be used as a body for a motor vehicle which is of a simple and economical construction.

With these and other objects and advantages in view, the invention consists in the new and useful combination, construction, and arrangement of parts as hereinafter described, set forth in the claims appended hereto, and disclosed in the accompanying drawings, wherein:

Figure 1 is a view showing a side elevation of a fuselage with the ends broken away and with wing receiving doors in the side.

Figure 2 is a cross section through the fuselage taken just ahead of the wings, with the ends of the wings broken away.

Figure 3 is a sectional plan through the fuselage taken on line 3—3 of Figure 2 with parts broken away.

Figure 4 is a vertical section through the fuselage taken on line 4—4 of Figure 2, also with parts broken away.

Figure 5 is a sectional plan through the fuselage taken on line 5—5 of Figure 6 with parts broken away and showing the wings folded.

Figure 6 is a cross section through the fuselage taken on line 6—6 of Figure 5 showing the wings folded.

Referring now to the drawings wherein like reference characters indicate corresponding parts the combination convertible motor vehicle body of this invention includes a body 10 having side walls 11 and 12, an upper wall 13 and a lower wall 14, wings 15 and 16, and a traveling pressure cylinder 7.

The side walls 11 and 12 of the body or fuselage are provided with openings 18 and 19 having hinged doors 20 and 21, and it will be understood that the length of the openings and doors is sufficient to receive the wings. The inner end 22 of the wing 15 is connected at the leading edge to a strut 23 by a hinge 24, and the wing is held outward by a pin 25 positioned in plates 26 and 27 as shown in Figures 2 and 3. To fold the wing the pin 25 is removed and the wing is turned about the pivot on the hinge until it reaches the position shown in Figure 5. The doors along the opening 18 may then be closed and the wing is completely concealed therein.

The inner end 28 of the wing 16 is connected through a hinge 29 to the cylinder 17 and this wing is held outward by a pin 30 held in plates 31 and 32. This wing is adapted to swing inward through the opening 19 in the wall 12, and as both wings are usually in the same plane the hinge 29 of the wing 16 is vertically movable so that after the wing is swung into the body it may be dropped downward to provide space for the wing 15. The hinge 29 is, therefore, mounted on the cylinder 17 and with a stationary piston 33 on the vertical rod 34 pressure may be applied through the connection 35 to the lower end of the cylinder to force the cylinder and wing downward, when folding the wings, and when it is desired to elevate the wing pressure is applied to the upper end of the cylinder through the connection 36.

The cylinder 17 is mounted between vertical struts 37 and 38 and a sliding collar 39 may be provided on the strut 38 that may be held by a pin 40 to secure the wing and cylinder in the upper position as shown in Figure 2.

With the parts arranged in this manner the wings may be folded into the body and with the body streamlined it may be used as the body of an automobile, and when desired, the wings may be opened so that it may be converted into an airship.

It will be understood that the structural elements and details of construction may be varied in proportion to the size of the vehicle and other modifications may be made in the design and arrangement of the parts without departing from the spirit of the invention.

What is claimed is:

1. In a combination motor vehicle body, a substantially hollow body having side and upper and lower walls with elongated openings in the side walls intermediate of the heighth thereof, doors hinged to the side walls providing closures for said openings, wings extending from said openings in the side walls, vertical struts in the body adjacent the forward ends of the openings, hinges mounting the wings through the inner ends and leading edges thereof on the vertical struts whereby the wings fold to positions inside of the body, and means raising and lowering one of said wings.

2. In a convertible motor vehicle body, a substantially hollow body having side and upper and lower walls with elongated wing receiving openings in the side walls intermediate of the heighth thereof, doors hinged to the side walls providing closures for said openings, wings adapted to extend from said openings in the side walls, vertical struts in the body adjacent the forward ends of the openings, hinges mounting the wings through the inner ends and leading edges thereof on the vertical struts whereby the wings swing to extended positions and fold to positions within the body, means locking the wings in the extended positions, and means lowering and raising one of the wings.

3. In a convertible motor vehicle body, a substantially hollow body having side and upper and lower walls with elongated wing receiving openings in the side walls intermediate of the heighth thereof, doors hinged to the side walls providing closures for said openings, wings positioned in the openings in the side walls, vertical struts in the body adjacent the forward ends of the openings in the side walls, hinges mounting the wings on the vertical struts whereby the wings swing to extended positions and fold to positions within the body, means locking the wings in the extended positions, means raising and lowering one of the wings, and means locking the wings provided with the raising and lowering means with the wing in the extended position.

4. In a combination automobile and airship body, a substantially hollow rectangular shaped body having side and upper and lower walls with elongated openings in the side walls intermediate of the heighth thereof, doors hinged to the sides providing closures for said openings, wings positioned in the openings in the side walls, a vertically disposed rod adjacent the forward end of the opening in one of said side walls, a pressure cylinder vertically slidable on said rod, a stationary piston on the rod positioned within the cylinder, fluid pressure connections in the opposite ends of the cylinder, a hinge mounting one of the wings on said cylinder through the inner end and leading edge thereof whereby the wing is adapted to be extended and also fold inward to a position within the body, said cylinder adapted to lower the wing mounted thereon with the wing positioned within the body, and means hinging the other wing through the inner end and leading edge thereof in the opening in the opposite side of the body whereby said wing may be extended or folded to a position within the body.

CHARLES B. SMITH.

REFERENCES CITED

The following references are of record in the file of this patent:

UNITED STATES PATENTS

| Number | Name | Date |
|---|---|---|
| 1,427,257 | Bowen et al. | Aug. 29, 1922 |
| 1,458,787 | Walden | June 12, 1923 |
| 2,350,608 | Griffith | June 6, 1944 |
| 2,410,239 | Roe | Oct. 29, 1946 |

FOREIGN PATENTS

| Number | Country | Date |
|---|---|---|
| 816,813 | France | May 10, 1937 |